United States Patent
Pollak

[15] 3,637,499
[45] Jan. 25, 1972

[54] AMINE DERIVATIVES OF DITHIOPHOSPHORIC ACID COMPOUNDS

[72] Inventor: Kurt Pollak, Westfield, N.J.
[73] Assignee: Esso Research and Engineering Company
[22] Filed: Mar. 16, 1970
[21] Appl. No.: 20,082

Related U.S. Application Data

[62] Division of Ser. No. 637,646, May 11, 1967, Pat. No. 3,546,324.

[52] U.S. Cl. ................. 252/32.7 R, 252/32.7 E, 252/389, 252/400
[51] Int. Cl. ........................................................ C10m 1/48
[58] Field of Search .................. 252/32.7 R, 32.7 E, 389, 400

[56] References Cited

UNITED STATES PATENTS 2,393,934   1/1946   Reiff et al. .................... 252/32.7 R
2,614,075   10/1952  Bartleson ..................... 252/32.7 R

*Primary Examiner*—Daniel E. Wyman
*Assistant Examiner*—I. Vaughn
*Attorney*—Pearlman and Stahl and Ernest V. Haines

[57] ABSTRACT

Lubricating oil compositions containing as antiwear and detergent-inhibitor additives therein, an amine neutralized derivative of a dithiophosphoric acid prepared by reacting a long chain alkenyl-substituted $C_3$–$C_8$ monocarboxylic acid of 400–3,000 molecular weight with a primary or secondary hydrocarbylol amine, reacting the resultant amide with a phosphorus sulfide and neutralizing the resultant dithiophosphoric acid with a polyamino compound.

9 Claims, No Drawings

AMINE DERIVATIVES OF DITHIOPHOSPHORIC ACID COMPOUNDS

This application is a division of copending application Ser. No. 637,646, filed May 11, 1967, now U.S. Pat. No. 3,546,324.

BACKGROUND OF THE INVENTION

1. Field of the Invention

This invention relates to a lubricant additive composition which comprises amine derivatives of dithiophosphoric acid compounds. More particularly, the invention pertains to oil-soluble amine derivatives of dithiophosphoric acid compounds prepared from $P_2S_5$ treated hydroxy-containing amides produced by reacting a high molecular weight carboxylic acid with a hydroxy-containing amine. In another aspect, the invention is concerned with lubricant compositions containing small amounts of a dithiophosphoric acid neutralized with an amine wherein the dithiophosphoric acid is prepared by $P_2S_5$ treating a N-(hydroxy-containing hydrocarbyl) alkenyl-substituted monocarboxylic amide.

2. Description of the Prior Art

Lubricants for modern high-compression piston-type internal combustion engines are required to have high detergency, efficient sludge-dispersing action and high oxidation resistance in order that those engines will be kept free of varnish, sludge and cokelike deposits. In other words, a heavy-duty detergent-type lubricating oil must be employed in such engines in order to maintain a high degree of engine cleanliness and thus promote engine life.

In the past, the majority of detergents, sludge dispersants and antioxidant materials that have been developed for use in lubricating oils for internal combustion engines have been metallic derivatives, particularly alkaline earth metal sulfonates, alkaline earth metal salts of alkyl phenol sulfides, colloidal dispersions of metallic carbonates (particularly alkaline earth metal carbonates), and the like. While, in general, additives of these types have proved to be quite satisfactory in their function as sludge dispersants and detergents, in many instances the ash content of these additives has presented a disadvantage in that the ash tends to accumulate in the combustion chamber of the engine to thereby cause preignition, spark plug fouling, valve burning and similar undesirable conditions. For this reason, as effective dispersant that is ashfree is preferable over an ash-forming detergent additive such as an alkaline earth metal salt of the types mentioned above. Ash-free dispersants are also of advantage in motor fuels, fuel oil compositions, and diesel fuels.

SUMMARY OF THE INVENTION

It has now been found, in accordance with the present invention, that certain amide derivatives of dithiophosphoric acid compounds function as effective ash-free antiwear and detergent-inhibitor additives in lubricating oils. Broadly, the additive of this invention is a dithiophosphoric acid neutralized with a monoamine or polyamine wherein the dithiophosphoric acid is prepared by $P_2S_5$ treating an N-(hydroxy-containing hydrocarbyl) alkenyl-substituted $C_3$-$C_8$ monocarboxylic amide. The hydrocarbyl referred to is a hydrocarbon radical selected from the group consisting of alkyl, cycloalkyl, aryl, and alkylaryl containing from 1 to 30 carbon atoms, preferably 1 to 12 carbon atoms. The hydrocarbyl may also include alkoxyalkyl, alkoxyaryl, iminoalkyl and iminoaryl $C_1$-$C_{30}$ radicals, i.e., those radicals having the formula: $+R-X+_n$ R-X-R wherein X represents oxygen or nitrogen, $n$ represents an integer ranging from 0 to about 10 and R represents an alkyl and/or aryl group of the type immediately following. Specific examples of hydrocarbyl groups include, among others, methyl, ethyl, butyl, hexyl, decyl, dodecyl, phenyl, tolyl, naphthyl, biphenyl, cyclohexyl, ethylcyclohexyl, cycloheptyl, methylcycloheptyl, ethoxyethyl, butoxybutyl, p-methoxyphenyl, etc. A preferred amide is N-(hydroxy-containing $C_1$-$C_6$ alkyl) alkenyl-substituted $C_3$-$C_8$ monocarboxylic amide. Even more preferred is N-di(hydroxy-containing $C_1$-$C_6$ alkyl) alkenyl-substituted $C_3$-$C_8$ monocarboxylic amide. The alkenyl group referred to is $C_2$-$C_5$ olefin polymerized to a molecular weight of 400-3,000.

The N-(hydroxy-containing hydrocarbyl) alkenyl-substituted $C_3$-$C_8$ monocarboxylic amide is prepared by simple reaction between a hydroxy-containing amine and an alkenyl-substituted $C_3$-$C_8$ monocarboxylic acid under conditions of amide formation. Typically, the alkenyl group is a polymer of a $C_2$-$C_5$ monoolefin, e.g., polyethylene, polypropylene, polyisobutylene, polybutene, polyamylene, ethylene-propylene copolymer, propylene-isobutylene copolymer, etc., wherein the olefin polymer has a number average molecular weight within the range of from about 400 to about 3,000. Especially useful products are obtained when the alkenyl group is polyisobutenyl having a molecular weight within the range between about 700 and 1,200.

In general, the aforedescribed alkenyl-substituted $C_3$-$C_8$ monocarboxylic acid may be derived from an alpha, beta-unsaturated monocarboxylic acid of from 3 to 8 carbon atoms and the aforedescribed $C_2$-$C_5$ monoolefin polymer in accordance with well-known techniques. For example, the $C_2$-$C_5$ monoolefin polymer may be halogenated with either bromine or chlorine, preferably the latter, using sufficient halogen to provide about 1 to 2 atoms per molecule of the olefin polymer. Halogenation can be effected at a temperature within the range from about ordinary ambient temperatures to about 250° F. To aid in the halogenation step, the polymer may be dissolved in a suitable solvent, such as carbon tetrachloride, although the use of such a solvent is not necessary. The time required for halogenation may be varied to some extend by the rate at which the halogen is introduced. Ordinarily from about 2 to about 5 hours is a satisfactory halogenation period. In a representative plane scale operation involving the chlorination of polyisobutylene of 830 molecular weight, a 100 pound batch will be chlorinated with 10 pounds of chlorine introduced into the reactor over a period of 3½ hours with a chlorination temperature of about 250° F.

The halogenated polymer thus obtained is condensed with an alpha, beta-unsaturated, monocarboxylic acid of from 3 to 8 carbon atoms. Ordinarily, because of their greater availability, acids of this class having 3 or 4 carbon atoms will be used. Such acids include acrylic acid, alpha-methylacrylic acid (i.e., 2-methyl propanoic acid) and crotonic or isocrotonic acid (beta-methacrylic acid). Other alpha, beta-unsaturated acids that may be employed include tiglic acid (alpha, methylcrotonic acid), angelic acid (alpha-methylisocrotonic acid), sorbic acid, and cinnamic acid.

In an alternate preparation the halogenated polymer may be condensed with an ester of the $C_3$ to $C_8$ unsaturated monocarboxylic acid, e.g., ethyl methacrylate, in place of the free acid. The esters that may be used in this alternate preparation are those of aliphatic alcohols having from 1 to 10 carbon atoms, including methyl, ethyl, isopropyl, isobutyl, amyl, hexyl, 2-ethyl hexyl, decyl, and $C_8$ oxo alcohols. Such esters include amyl acrylate, isopropyl methacrylate, butyl crotonate, methyl acrylate, etc. In the subsequent amidation reaction an alcohol will be split out in place of water. The higher boiling the alcohol, the more difficult will be the removal of the alcohol from the reaction mixture. Generally, alcohols boiling above about 285° F. will not be desirable for this reason. Furthermore, use of higher-boiling alcohols represents an economic disadvantage in that excess weights of materials are thus being put into the reaction only to be removed later. More preferably, the esters that will be used here are those of $C_1$-$C_5$ aliphatic alcohols.

When the alkenyl substituted monocarboxylic acid is prepared by condensing the halogenated polyolefin with the alpha, beta-unsaturated acid or with an aliphatic ester thereof, at least one mole of acid or ester is used per mole of halogenated polyolefin. Normally, the acid or its ester will be employed in excess and may amount to as much as 1.5 to 2 moles per mole of halogenated polyolefin. The condensation temperature may be in the range of from about 300° to 500° F.

and will more preferably be within the range of from about 375° to 475°. The condensation temperature may require from about 3 to about 24 hours but will ordinarily take place in from 6 to 18 hours. After the reaction has been completed, excess acid or ester may be purged from the mixture, for example, by blowing with a stream of nitrogen at a temperature of 400° to 500° F.

The present invention is not known to be dependent in any way on the method of preparing the aforedescribed alkenyl-substituted carboxylic acid. Other methods for the preparation are well known to those skilled in the art. Consequently, such materials may be used regardless of their sources.

The aforedescribed alkenyl-substituted monocarboxylic acid is reacted with a hydroxy-containing primary or secondary amine to produce an intermediate amide product which is subsequently $P_2S_5$ treated. As previously indicated, this intermediate product is an N-(hydroxy-containing hydrocarbyl) alkenyl-substituted monocarboxylic amide. Specific examples of suitable hydroxy-containing primary amines include, among others, ethanolamine, propanolamine, 6-amino-1-hexanol, 5-amino-1-pentanol, aminocyclopentanols, aminocyclohexanols, o, m or p-aminophenols, aminonaphthols, 2-(2-aminoethoxy) ethanol, 2-(2-iminoethylamino) ethanol, etc. Nonlimiting examples of suitably employed monohydroxy or dihydroxy secondary amines (i.e., monohydroxy or dihydroxy-containing imino compounds) include 2,2'-iminodiethanol; 1,1'-iminodi-2-isopropanol; N,N-bis(4-cyclohexanol) amine; and 4,4'-dihydroxydiphenylamine.

The alkenyl-substituted carboxylic acid and hydroxy-containing amine compound are reacted under conditions causing amide formation. Such conditions are well known in the art, and it is not intended that the additive of this invention be limited to any specific method of preparation. By way of example, the amide can be formed by reacting the carboxylic acid and the hydroxy-containing amine compound in the presence of a suitable solvent, e.g., neutral mineral oils, toluene, xylene, etc., at elevated temperatures, e.g., 230°–450° F., and atmospheric pressure for a period of time ranging from about 4 to about 24 hours.

The aforedescribed N-(hydroxy-containing hydrocarbyl) alkenyl-substituted amide is reacted with a phosphorus sulfide such as phosphorus pentasulfide, $P_2S_5$, under conditions causing phosphorodithioic acid formation. The dithiophosphoric acid formation is effected by means well known in the art. For example, the $P_2S_5$ may be reacted with a single hydroxy-containing amide compound or mixtures of said compounds by mixing the reactants at a temperature of about 125° to 175° C., preferably 140° to 160° C. using about 0.25 to about 0.50 moles of $P_2S_5$ per alcohol group. The completion of the reaction may be noted visually and will be indicated by the dissolution of the $P_2S_5$. The reaction time required would generally be in the range of about 0.5 to 24 hours, usually about 3 to 6 hours. After the reaction is completed, the reaction is preferably blown with nitrogen or other inert gas to remove hydrogen sulfide therefrom. If desired, the reaction may be carried out in a solvent such as a mineral oil, toluene, xylene, etc.

The dithiophosphoric acid thus formed is neutralized with acyclic or cyclic, primary or secondary mono and polyamines containing from 1 to about 24 carbon atoms. It is preferred, however, to use an aliphatic polyamine having the following general formula:

$$NH_2(CH_2)_n-[NH(CH_2)_n]_m-NH_2$$

wherein $n$ is 2 to 3 and $m$ is a number from 0 to 10. Specific compounds coming within the formula include, among others, diethylene-triamine, tetraethylenepentamine, dipropylenetriamine, octaethylenenonamine, and N,N-di-(2-aminoethyl) tetrapropylenepentamine may also be used. Other aliphatic polyamino ethylenediamine compounds that may be used are N-aminoalkylpiperazines of the formula:

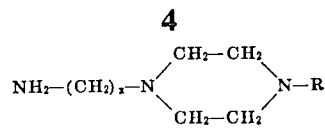

wherein x is a number 1 to 3, and R is hydrogen or an aminoalkyl radical containing 1 to 3 carbon atoms. Specific examples include N-(2-aminoethyl) piperazine, N-(2-aminoisopropyl) piperazine, and N,N'-di-(2-aminoethyl) piperazine.

The use of mixtures of alkylene polyamines, mixtures of N-aminoalkyl piperazines, and mixtures of the alkylene polyamines with the N-aminoalkyl piperazines is also contemplated, and the term aliphatic polyamine is intended to embrace all of these materials.

Neutralization of the dithiophosphoric acid with the amine is conventionally effected, for example, by simple mixing of the reactants at ambient temperatures and pressures.

The additive products of this invention may be incorporated in lubricating oil compositions in concentration ranges of from about 0.001 to about 10 wt. percent and will ordinarily be used in concentrations of from about 0.1 to about 5 wt. percent. The lubricating oils to which the additives of the invention may be added include not only mineral lubricating oils, but synthetic oils also. The mineral lubricating oils may be of any preferred types, including those derived from the ordinary paraffinic, naphthenic, asphaltic, or mixed base mineral crude oils by suitable refining methods. Generally they will have a viscosity at 210° F. of between about 45 and about 90 SUS (Saybolt Universal Seconds) and at 100° F. a viscosity of between about 150 and about 1100 SUS. The viscosity indices of these oils will generally range between about 0 and about 100 or more. In the case of oils employed in high-speed, heavy-duty diesel engines, oils of high viscosity indices are often preferred, i.e., of the order of 100 or higher, but usually most diesel engines employ lubricating oils having viscosities of between about 75 and about 80 SUS at 210° F. and at 100° F. of between about 800 and about 1,250 SUS with viscosity indices ranging between about 55 and about 80. Synthetic hydrocarbon lubricating oils may also be employed. These synthetic oils include, among others, dibasic acids esters such as di-2-ethyl hexyl sebacate, carbonate esters, phosphate esters, halogenated hydrocarbons, polysilicones, polyglycols, glycol esters such as $C_{13}$ oxo acid diesters of tetraethylene glycol, and complex esters as for example the complex ester formed by the reaction of 1 mole of sebacic acid with 2 moles of tetraethylene glycol and 2 moles of 2-ethyl hexanoic acid.

In the lubricant compositions of this invention, other conventional additives may also be present, including dyes, pour point depressants, antiwear agents, e.g., tricresyl phosphate, zinc dialkyl dithiophosphates of 3 to 8 carbon atoms, antioxidants such as phenyl-alhpa-naphthylamine, tertiary octylphenol sulfide, bis-phenols such as 4,4'-methylene bis (2,6-ditertiary butylphenol), viscosity index improvers such as polymethacrylates, polyisobutylene, alkyl fumarate-vinyl acetate copolymers, and the like, as well as other dispersants.

It is within the contemplation of this invention to prepare additive concentrates in which the concentration of additive is greater than would normally be employed in a finished lubricant. These concentrates may contain in the range of from 10 to 80 percent of additive on an active ingredient basis, the balance being a hydrocarbon solvent such as, for example, a mineral oil. Such concentrates are convenient for handling the additive in the ultimate blending operation into a finished lubricating oil composition. The additive concentrates may be made up simply of an additive of the present invention in a suitable mineral oil medium or they may include other additives that are intended for use along with the additives of the invention in a finished lubricant. Thus, if the additives are to be used in conjunction with conventional detergents, an additive concentrate can be prepared containing say 30 to 60 wt. percent of an additive of the invention and 5 to 20 wt. percent of a metal sulfonate, e.g., calcium petroleum sulfonate from sulfonic acids of about 450 molecular weight, or a metal alkylphenol sulfide, e.g., calcium nonylphenol sulfide, with the balance being a mineral lubricating oil. Additionally, 5 to 15 wt. percent of an antiwear agent such as zinc dialkyldithiophosphate, e.g., mixed zinc butyl and amyl dithiophosphates may also be present in the additive concentrate package.

The invention can be more fully understood by reference to the following examples.

EXAMPLE 1

This example serves to illustrate the preparation of a polyisobutenyl propionic acid.

A 110-pound portion of polyisobutylene of 780 molecular weight (as determined by osmometry) was heated to 250° F., then a stream of chlorine was passed through the heated polyisobutylene at the 250° F. temperature at a rate of 2.5 pounds of chlorine per hour for a total of 4 hours, the total chlorine treat thus being 10 pounds. A sample of the chlorinated product analyzed 4.3 percent chlorine and had an API gravity of 23.3 To the chlorinated polyisobutylene there was added 10.5 pounds of acrylic acid. Over a period of 2 hours the temperature was raised from 250° F. to 425° F. and the pressure was increased to 20 p.s.i.g. Heating was continued for 5 hours at 425° F. and the reaction vessel was vented to maintain the pressure of 20 p.s.i.g. The pressure was then released and the mixture was purged with nitrogen for 2 hours to remove unreacted acrylic acid. The polyisobutenyl propionic acid thereby obtained weighed 109.3 pounds and had a total neutralization number (ASTM D-644) of 46.2 milligrams of KOH per gram. The chlorine content was found to be 0.3 wt. percent.

EXAMPLE 2

An additive of this invention was prepared as follows:
Into a glass reaction vessel fitted with a mechanical stirrer, heating mantle, thermometer and condenser containing 1,245 grams of polyisobutenyl propionic acid produced in the manner of example 1 (number average molecular weight 1245, ASTM Neut. No. 45) in 1,000 grams of a solvent neutral mineral oil (150 SUS viscosity at 100° F.) there were charged 105 grams of 2,2'-iminodiethanol. The resulting mixture was then heated at about 300° F. for a period of about 16-18 hours. The reaction mixture was thereafter cooled to about 150° F. whereupon 111 grams of $P_2S_5$ was added over a period of about 15 minutes. Upon completion of the $P_2S_5$ addition, the mixture was heated at about 300° F. for about 4 hours. The mixture was cooled to room temperature and 52.5 grams of diethylene triamine was slowly added over a period of about 30 minutes. After stirring for 1 hour, the product was filtered through Dicalite in the cold. The final product recovered totaled 2,322 grams of which 55 wt. percent was additive product, the remainder being the mineral oil.

EXAMPLE 3

The procedure of example 2 is repeated, but instead of the iminodiethanol the polyisobutenyl propionic acid is reacted with 61 grams of ethanol amine. The resulting hydroxy-containing amide product is then treated with 55.5 grams $P_2S_5$ and thereafter reacted with the diethylenetriamine.

A number of routine tests were carried out on a typical base oil containing the novel additive hereinbefore described in order to illustrate the beneficial effects derived therefrom. The following tests were performed.

1. An Oxidation Stability Test was used for a laboratory evaluation of the antioxidant properties of the additive. This test involves heating the compound oil to a temperature of about 340° F. in the presence of a copper-lead oxidation catalyst while intimately mixing the compounded oil with air at the rate of 2 c.f./hr. The viscosity increase (SUS, at 100° F.) after 23 hours is measured ad a determination of the percentage of viscosity increase over that of the original unoxidized oil is made.

2. A Copper-Lead Bearing Weight Loss, in milligrams, involving the compounded oil was also conducted. The measure of the change in weight of the Cu-Pb catalyst in test (1) in milligrams is determined.

3. The well known Falex Test as described in, for example, U.S. Steel Manual, Proposed Falex Machine Method ASTM D-2 Section V, Tech. k was used to determine the antiwear properties of the novel additives.

4. The Disc and Rider Test was also used to evaluate the antiwear properties of the additive. In this test, a spinning (50 r.p.m.) steel disc is contacted with a fixed steel ball (1.25 cm. dia.), and a load of 500 g. is then impressed upon the disc. A film of oil is maintained on the spinning disc at the point of contact with the steel ball. A constant electrical voltage is then applied between the spinning disc and the steel ball. The resulting resistance is measured after 20 minutes for test employing the base oil with no additive and the base oil containing an additive of this invention. The resistance recorded when employing the base oil alone was given a metallic contact of 100 percent, and other resistance readings were given proportionately higher or lower percent metallic contact, i.e., the resistance between the ball and disc was found to be proportional to the percent metallic contact with the higher percent metallic contact giving the lower resistance.

A series of tests were carried out using a typical base oil containing various amounts of additive of this invention and prior art additives. The base oil can best be described as being a phenol extracted oil having a viscosity at 210° F. of 60 SUS and at 100° F. of 460 SUS. The results are given below in tables I-III.

TABLE I.—OXIDATION STABILITY TEST

| Oil tested | Percent viscosity increase SUS at 100° F., 23 hours | Cu-Pb bearing weight loss, mg. |
|---|---|---|
| Base oil alone | 85 | 143 |
| Base oil plus 5.0 weight percent of product of Example 2 (55 weight percent active ingredient) | 8.6 | 27 |
| Base oil plus 5.5 weight percent of PIBA/TEPA condensate [1] | 110 | 330 |
| Base oil plus 5.0 weight percent of PIBA/TEPA condensate [1] plus 0.5 weight percent ethyl 728 | 85 | 223 |
| Base oil plus 3 weight percent of PIBA/TEPA condensate [1] plus 0.5 weight percent ethyl 728 [2] plus 2.0 weight percent of product of Example 2 | 7.2 | 28 |

[1] Condensation product of 3 parts by weight of polyisobutenyl propionic acid (830 molecular weight) and 1 part by weight of tetraethylenepentamine (50% A.I.).
[2] Bisphenol antioxidant.

From the above data in table I, it is really apparent that the amine neutralized dithiophosphoric acid of this invention is very effective in providing oxidation stability and inhibition of Cu-Pb corrosion.

TABLE II

FALEX TEST[1]

| Oil Tested | Mg. Wt. Loss |
|---|---|
| Base Oil alone | Failure |
| Base Oil + 2.0 wt. % of product of example 2 (55 wt. % active ingredient) | 1.1 |

[1] 2 min. at 250 lb., 8 min. at 400 lb.

TABLE III

DISC AND RIDER TEST

| Oil Tested | Coefficient of Friction μ Avg. | % Metallic Contact |
|---|---|---|
| Base Oil alone | 0.148 | 100 |
| Base Oil + 1.0 wt. % of product of example 2 (55 wt. % active ingredient) | 0.116 | 65 |

It is seen from the data presented in tables II and III that the additive of this invention is an effective antiwear agent.

What is claimed is:

1. A lubricant composition comprising a major proportion of a lubricating oil to which has been added from about 0.001 and 10.0 wt. percent of an additive which is an amine neutralized derivative of a dithiophosphoric acid prepared by reacting an alkenyl-substituted $C_3$–$C_8$ monocarboxylic acid, wherein the alkenyl group is a polymerized $C_2$–$C_5$ monoolefin having a number average molecular weight between about 400 and about 3,000 with a primary hydrocarbylol amine or a secondary dihydrocarbylol amine, wherein the hydrocarbylol radical is selected from the group consisting of alkylol, arylol, and cycloalkylol, each containing from 1 to 30 carbon atoms, to form the corresponding N-(hydrocarbylol) substituted amide, reacting the said amide with a sulfide of phosphorus, and neutralizing the resultant dithiophosphoric acid with a polyamine selected from the grip consisting of:

and

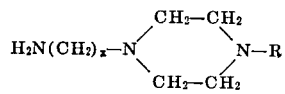

wherein $n$ is a number from 2 to 3, $m$ is a number from 0 to 10, $x$ is a number from 1 to 3, and R is hydrogen or an aminoalkyl radical containing 1 to 3 carbon atoms.

2. A lubricant composition as in claim 1 wherein the neutralizing polyamine is a polyalkylene polyamine.

3. A lubricant composition as in claim 1 wherein the neutralizing polyamine is an N-aminoalkyl substituted piperazine.

4. A lubricant composition as in claim 1 wherein the hydrocarbylol amine is a $C_1$–$C_6$ alkylolamine.

5. A lubricant composition as in claim 1 wherein the alkenyl radical has a molecular weight of between about 700 and about 1,200.

6. A lubricant composition as in claim 2 wherein the hydrocarbylol amine is a $C_1$–$C_6$ alkylolamine, the alkenyl radical has a molecular weight of between about 700 and about 1,200, the sulfide of phosphorus is phosphorus pentasulfide and the polyamine is diethylene triamine.

7. A lubricant composition as in claim 6 wherein the hydrocarbylol amine is diethanolamine and the carboxylic acid is polyisobutenyl propionic acid of about 780 molecular weight.

8. An additive concentrate comprising a mineral lubricating oil containing between about 10 and about 80 wt. percent of the amine neutralized derivative of a dithiophosphoric acid as defined in claim 1.

9. An additive concentrate comprising a mineral lubricating oil containing between about 10 and about 80 wt. percent of the amine neutralized derivative of a dithiophosphoric acid as defined in claim 2.

* * * * *